(12) United States Patent
de Guevara (10) Patent No.: US 7,695,630 B2
(45) Date of Patent: Apr. 13, 2010

(54) PROCESS FOR CONDITIONING AN AQUEOUS SOLUTION FOR EFFICIENT COLLOIDAL PRECIPITATION

(76) Inventor: Cesar Ladron de Guevara, 3180 Seneca Dr., Las Vegas, NV (US) 89169

( * ) Notice: Subject to any disclaimer, the term of this patent is extended or adjusted under 35 U.S.C. 154(b) by 627 days.

(21) Appl. No.: 11/595,695

(22) Filed: Nov. 10, 2006

(65) Prior Publication Data

US 2007/0108132 A1 May 17, 2007

Related U.S. Application Data

(60) Provisional application No. 60/834,082, filed on Jul. 28, 2006, provisional application No. 60/736,402, filed on Nov. 15, 2005.

(51) Int. Cl.
C02F 1/56 (2006.01)
(52) U.S. Cl. .................. 210/709; 210/725; 210/727
(58) Field of Classification Search .................. 210/726
See application file for complete search history.

(56) References Cited

U.S. PATENT DOCUMENTS

| 3,594,313 A * | 7/1971 | Carlson ................ 210/218 |
| 3,617,568 A * | 11/1971 | Ries, Jr. ................ 210/727 |
| RE28,940 E * | 8/1976 | Komline et al. ........... 204/549 |
| 4,049,545 A * | 9/1977 | Horvath ................ 210/665 |
| 4,081,365 A * | 3/1978 | White et al. ............ 210/626 |
| 4,388,195 A | 6/1983 | von Hagel et al. |
| 4,670,158 A * | 6/1987 | Kelly ................ 210/705 |
| 5,034,137 A * | 7/1991 | Okamoto et al. ........ 210/725 |
| 5,039,428 A | 8/1991 | Wentzler et al. |
| 5,084,186 A * | 1/1992 | Gilchrist ................ 210/709 |
| 5,730,864 A | 3/1998 | Delsalle et al. |
| 5,770,091 A | 6/1998 | Binot et al. |
| 5,897,810 A | 4/1999 | Tamaura et al. |
| 6,210,587 B1 | 4/2001 | Vion |
| 6,277,285 B1 | 8/2001 | Vion |
| 6,319,412 B1 * | 11/2001 | Reyna ................ 210/666 |
| 6,787,037 B2 | 9/2004 | Rick |
| 6,893,567 B1 | 5/2005 | Vanotti et al. |
| 6,916,431 B2 | 7/2005 | Keller |
| 6,919,031 B2 | 7/2005 | Blumenschein et al. |
| 6,929,759 B2 | 8/2005 | Fruh et al. |

OTHER PUBLICATIONS

Cytec Cationic Emulsion Flocculant—Superfloc 4516 Flocculant, Fact Sheets from Cytec Industries Inc., West Paterson, New Jersey, Jun. 8, 2004 (2 pages).
Cytec Cationic Emulsion Flocculant—Superfloc 4518 Flocculant, Fact Sheets from Cytec Industries Inc., West Paterson, New Jersey, Jun. 8, 2004 (2 pages).
"Hyperfloc" Anionic Dry Flocculant—AF 304 Fact Sheet by Hychem, Inc., Tampa, Florida, Jun. 1998 (1 page).
"Hyperfloc" Anionic Dry Flocculant—AF 307 Fact Sheet by Hychem, Inc., Tampa, Florida Jun. 1998 (1 page).
"Everything you want to know about Coagulation & Flocculaton . . . ", Fourth Edition Apr. 1993, Zeta-Meter, Inc.

* cited by examiner

Primary Examiner—Peter A Hruskoci (57) ABSTRACT

An ionic conditioning process and molecular arrangement for removing colloids from an aqueous solution, where the aqueous solution is transported to and/or through several conditioning zones for purification. The process utilizes vessels within which stages of conditioning are performed and are monitored. The conditioning processes perform ionic, chemical and physical conditioning to the colloids in the aqueous solution causing the colloids to be transformed into a state that reacts with a polymer flocculating agent and is thereby precipitated rapidly and efficiently for removal. The effluent as well as the precipitate can be further treated with conventional means to meet certain specifications for discharge and disposal.

5 Claims, 6 Drawing Sheets

PROCESS FOR CONDITIONING AN AQUEOUS SOLUTION FOR EFFICIENT COLLOIDAL PRECIPITATION

CROSS REFERENCE TO RELATED APPLICATION

This application claims priority under 35 USC 119(e) of Provisional Application Ser. No. 60/736,402 filed Nov. 15, 2005 and of Provisional Application Ser. No. 60/834,082 filed Jul. 28, 2006, both of which are incorporated herein by reference.

FIELD OF THE INVENTION

Colloidal conditioning for separation and product production is utilized in various industrial processing of aqueous solutions along with the treatment of water and wastewater. Water is a renewable resource. Some water treatments involve the removal of impurities, which can include solids; inorganic compounds, and organic compounds.

In industrial processing of aqueous solutions there are times when a process of colloidal conditioning for sizing characteristics and/or precipitation is a part of a product processing format. Solid matter removal may derive further benefits, i.e.—BOD, nitration, Ca, pH, along with other elements.

Separation of colloids and colloid clusters from an aqueous solution containing such, is usually performed by filtration, flotation and sedimentation. Colloids are usually combined into colloid clusters in order to facilitate separation. In water and wastewater treatment, the converting of used water into environmentally acceptable water or even drinking water is the usual object.

The present invention relates generally to the field of conditioning an aqueous solution for the efficient precipitation of colloids (the process of separating the colloids or solid matter from the aqueous solution), and also for the efficient conditioning of colloids for industrial product processing formats.

BACKGROUND OF THE INVENTION

Aqueous solutions containing suspended colloids, present a problem with respect to removal of the colloidal particles. These colloids carry the same charges, and the electrostatic barrier repulsion prevents them from combining into larger colloid clusters for precipitation. Thus, some chemical and physical techniques are applied to help them precipitate. The phenomenon is known as coagulation where the colloids are combined with each other or flocculation where a flocculating agent is added.

A traditional method of coagulation is performed with the addition of an electrolyte. Charged particulates combine with the electrolyte ions neutralizing the charges. The neutral colloids combine to form larger colloid clusters, and finally precipitate.

A traditional method of flocculation is to use high-molecular-weight material to attract or trap the agglomerates with the flocculent, achieving a higher specific gravity and then settling down together. Starch and multiple charged ions are often used. Polymers with multiple charged sites are also commercially available for this purpose. In essence, various charged sites on these high-molecular-weight materials can collect colloids into an agglomeration or bridge format.

In traditional methods, dirty water is cleaned by treating with electrolytes such as Alum ($Al_2(SO_4)_3 \cdot 12H_2O$), Ferric Chloride ($FeCl_3$), Ferrous Sulfate, ($FeSO_4$), Ferric Sulfate ($Fe_2SO_4$). The addition of those salts as an electrolyte may cause the pH to be lowered to the point where soluble ions ($Al^{+3}$, $Fe^{+3}$) are formed instead of hydroxide compounds. This is due to the Carbonic Acid formation and the sulfate ions ($SO_4^{-3}$). This practice in traditional methods produces unstable reactions creating turbidity and dispersion of the coagulation. In order to control dispersion it is usual to add either lime, Calcium Hydroxide ($Ca(OH)_2$), Sodium Hydroxide (NaOH), Soda Ash ($Na_2CO_3$), or Sodium Bicarbonate ($NaHCO_3$) or a combination thereof in order to balance the pH and the desired level of alkalinity. Traditional methods of treatment as described are only applications for colloidal removal from wastewater in a limited range of pH levels approaching 5 to about 7.

Determining the amount of electrolyte addition needed in order to obtain good coagulation results is as much an art as it is a science. Often, the correct formulation parameters is determined by experience coupled with trial and error testing with utilization of commercially available laboratory jar test equipment with jars of different shapes and or sizes. Formulation parameters of the present invention includes the amount of electrolyte, retention times, pH of solution and mixing characteristics.

The measurement of Zeta potential is another aid to determining the amount of electrolyte necessary to add to the aqueous solution being treated in order to coagulate or agglomerate its colloids into clusters. Equipment for measurement of Zeta potential is commercially available from Zeta-Meter, Inc, Staunton, Va. and its use is explained in their publication "Everything You Want to Know About Coagulations & Flocculation" Fourth Edition, 1993 (published by Zeta-Meter, Inc, available at www.mtec.org), and outlined below.

In order for colloids to combine together to form the colloid clusters, the repulsion between the colloids must be reduced. As explained in the Zeta-Meter Publication (Supra), Zeta potential is directly related to the charge strength on the colloids. Therefore, with Zeta potential instrumentation one can track the reduction of the charge force or barrier on the colloids. When the charge on the colloids is reduced sufficiently to allow the particles to collide, Van der Waals forces become the predominant force between the colloids and they form clusters. Because the Zeta potential is traditionally reduced to near zero, this mechanism is known as neutralization.

In traditional water treatment methods, those neutralized colloid clusters are removed from the aqueous solution.

Processes using addition of ballast flocculation and chemical precipitation are disclosed in U.S. Pat. No. 6,919,031. Numerous technologies have been developed over the years that are designed to maximize the efficiency and minimize the cost of each of the steps performed in a physical-chemical treatment process. Examples of such designs are disclosed in U.S. Pat. Nos. 4,388,195, 5,039,428, 5,730,864, 5,770,091, 6,210,587, and 6,277,285. Those technologies typically attempt to increase the coagulation and settling rates of suspended particles in the effluent. The coagulation and settling rates are influenced by a variety of factors, including the type and density of the particle and the concentration of solids being settled. However, the use of ballast material and inorganic compounds increase the solid volume, thus the resulting sedimentation is larger in volume, and the operation can become extremely complicated.

Another attempt to increase the flocculation is disclosed in U.S. Pat. No. 5,897,810 by using of shell fossil powder as a $Ca^{2+}$ source, the method includes the use of aluminum sulfate to improve the floc forming mechanism, and gypsum as a flocculation agent. Perhaps the use of aluminum sulfate creates hazardous solids and the shell fossil powder requires rare and expensive material to be obtained.

The present invention uses some of the traditional electrolytes, but in a different way, in order to accomplish a unique series of process steps which increase the efficiency of the colloidal precipitation process and remove not only the colloids but also substantial amounts of specifically targeted dissolved solids. In particular, in the coagulation step, the colloid is not subjected to neutralization but rather carries a substantial charge thus achieving a Zeta potential specific to this process. This process subjects the colloid to substantially different than traditional reaction conditions.

With the present invention, there are two mechanisms that are responsible for bringing the targeted dissolved solids into becoming suspended solids and then progress into colloids. The first mechanism action engages when existing molecules with positive radicals or positive dipole charges bind with the trivalent negative ions $PO_4^{-3}$ thus binding the dissolved solids and bringing them to the colloidal state. The second mechanism supports the dissolved solids becoming suspended solids and colloids. That mechanism is the result of the ionic migration of $Ca^{+2}$ ions as a dissolved solids (hardness) exchanging with the existing targeted dissolved solids.

In particular, the invention improves the colloid cluster charge availability and fragmentation process along with increasing the efficiency of a precipitation process. The present invention conditions the aqueous solution and its ionic, physical and chemical nature in three treatment steps and thereafter, if required, a separation process could be used to remove the resultant colloid clusters. In essence the process of the present invention conditions the aqueous solution in several steps to form flocculants, which can efficiently be removed by traditional separation processes, such as sedimentation and/or flotation.

The present invention has the objective, in the first step, to condition a stable colloidal suspension to become an unstable colloidal suspension (with a substantial charge or Zeta Potential) by way of ionic layer compression. The ionic compression enables the unstable colloidal suspension to agglomerate to form large colloidal clusters. The resulting colloidal clusters are kept in suspension e.g. by the aqueous solution being constantly mixed.

The present invention has the objective in the second step to further condition the large colloidal clusters so that they fragment into smaller clusters, which are kept in suspension e.g. by constant mixing of the aqueous solution.

In the third step of the present invention the fragmented colloid clusters are interacting with a flocculating agent (preferably a polymer type) that was injected into the aqueous solution. The flocculating agent flocculates the fragmented colloid clusters, which prepares the solution for a precipitation process (if desired) in the next step. The solution is normally constantly mixed in the third step in order to keep the flocculants in suspension and to permit uniform interaction of the flocculating agent and the suspension colloids. The flocculated solution could be delivered to a fourth step for separation and removal of the flocculates from the solution.

The present invention has the object to condition the aqueous solution so that the colloids can be clustered, sized, flocculated and then precipitated efficiently with the utilization of traditional separation means.

BRIEF DESCRIPTION OF THE INVENTION

The present invention conditions aqueous solutions in three steps preparing the resulting colloidal clusters for its precipitation.

It should be noted that the present invention could be utilized with only two of its three steps as stated previously and as being described herein. The first two steps can be utilized, for example, for the obtaining of specified certain colloidal characteristics when utilized for such within special industry processes i.e. whereby colloidal or colloid cluster characteristics and/or colloidal or colloid cluster sizing is the objective. Some industry processes, as in product production, utilize characteristics as derived from portions of the three steps of the present invention and can be utilized within their product processing schemes. Some of the manufactured products that utilize colloid cluster conditioning and or sizing are ice cream, chocolates, cosmetics, paint, paper, medicines, etc. These are just a few examples whereby the present invention could improve upon traditionally utilized product processing techniques for colloidal conditioning.

Before the three steps of the present invention are applied in the treatment of treatable aqueous solutions, large solid matter, if any, are removed, in a pretreatment step, by usual separation methods (e.g. sedimentation, flotation and/or screening).

In the first step of the present invention, there is an agglomeration of colloids into large colloidal clusters (approx 1-3 mm). However, unlike traditional colloidal removal processes, the process of the present invention uses mixing to prevent sedimentation of the large colloid clusters. To form the large clusters, the present invention reduces the electrostatic barrier (repulsive force) between the like-charged colloids by ionic layer compression. This allows the Van der Waals forces to dominate so that the colloids conjoin to form large colloid clusters. Electrolytes used in the present invention to provide a high positive net charge to the colloidal particles, thereby subjecting them to ionic layer compression in the aqueous solution allowing the energy barrier to be overcome by Van der Waals forces. The aqueous solution is subjected to mixing that causes a homogenous environment so as to promote uniform conditioning reactions. Depending on the mixtures being treated, usual mixing parameters for traditional treatment are used. Mixing speed may be increased a little if necessary, to keep the forming clusters in suspension. The mixing action provides kinetic energy to the colloids contained within the aqueous solution. This kinetic energy assists in the coagulation process by bringing the particles into close proximity. When colloid surfaces are brought close enough together (e.g. 0.01 microns or less) the Van der Waals forces overpower the repulsion forces. In other words, mixing or agitation of the suspended colloid particles assists in the coagulation of the colloids by inducing the particles to come close or collide, resulting in coagulation of the colloids and thus forming clusters. The mixing also keeps the large clusters of agglomerated colloids in suspension and prevents their settling. The mixing or agitation is controlled so as not to cause shear of the coagulated colloids.

In the second step, the Zeta potential is lowered by the introduction of a negative charge. The negative charge creates a repulsion effect within the cluster, thus causing fragmenting of the large clusters of colloids. This reaction is caused preferably with the addition of a non-metallic acid. Although lowering Zeta potential is traditionally associated with a reduction of the charge and therefore results in increasing the stability of the agglomerated particles, the use of a non-metallic acid to lower the Zeta potential, as used in the present invention, in fact causes the large clusters of colloids (approx 1-3 mm) to fragment and form smaller clusters (approx 0.1-1 mm). This resulting action is believed to be caused by the pressure of non-homogeneous charge distribution on the clusters, causing localized repulsion of one part of the cluster against another like charged part, thus causing the clusters to fragment.

Each fragmented colloidal cluster is a "mosaic of positive and negative patches" on the cluster surface, with a predominant positive charged surface (Model Patch Theory). Those negative regions in the "mosaic" that are responsible for the localized repulsion of one part of the cluster against another, resulting with negative charged regions and positive charged regions (patches) on the fragmented colloidal cluster surfaces.

The resulting fragmented colloidal clusters are smaller in size than the originating clusters, thus providing numerously more cluster particles with more total surface area available and therefore more available charged particles for reacting with a flocculating agent. The aqueous solution is subjected to sufficient mixing to maintain a homogeneous environment that promotes uniform conditioning reactions, but with sufficient speed to keep the fragmented colloid clusters in suspension.

The third step uses a flocculation agent to flocculate the fragmented colloid clusters into easily removable flocculants. Because there are both positive and negative "patches" present on the colloidal clusters, the flocculating agent can be anionic or cationic. The aqueous solution is subjected to slow mixing which causes a homogeneous environment that promotes uniform flocculation of the colloid clusters and a uniform activation of the flocculating agent. The removal of the flocculants can be performed in further steps by any usual method and as required to meet discharge specifications. The conditioning of the aqueous solution with the use of the present invention greatly assists in efficient removal of the flocculants with the utilization of traditional removal processes.

DETAILED DESCRIPTION OF THE INVENTION

The present invention is an improved process for conditioning an aqueous solution for efficient colloidal precipitation.

Electrostatic potential as used herein is the measured Zeta potential.

Although the invention is being described in a manner that examples one embodiment consisting of a flow through type process utilizing vessels for Zone processes (e.g. see FIG. 6), the present invention can be performed as a batch process with the utilization of a single vessel and the implementation of the present invention's process steps performed in a consecutive sequence, allowing for enough detention time between steps to permit the desired reactions to be accomplished prior to proceeding to the following step of the present invention. It is also contemplated that the precipitation process step as well as tertiary treatment methods may also be contemplated for use in the same vessel. At a particular time or times, in the batch process mode, precipitated solid matter may be removed for disposal or further processing. At a specific time or times, the effluent might be removed for use, further treatment or disposal. Also contemplated as an embodiment of the present invention is a processing flow pattern whereby the reactions of the present invention described herein are accomplished in a closed, continuous flow configuration whereby the influent is delivered into the tubular conveyor and is processed with the conditioning steps of the present invention at predetermined sections of the tubular conveyor. The aqueous solution flow is treated to predetermined specification levels and discharged from the processing zones of the tubular conveyor for use, additional treatment or disposal. Just as mentioned prior, it is contemplated that all or some of the steps of the present invention may be utilized in various processes for various specified results, all within the scope of the claims of the present invention.

Industries where the technology can be applied most effectively to treating aqueous solutions as a part of the product production process or as discarded aqueous solutions are as follows:

1. Food processing:

a. Beverage industry (juices, carbonates, beer, alcohol, etc.)

b. Vegetable, fruit and grain processing, and as used for washing and mechanical transport, such as:
   Wineries.
   Apple processing (soda, juice, canning).
   Corn industry (tortillas, packing, canning).
   Wheat processing.
   Tomato processing.
   Orange processing.
   Vegetable processing.
   Sugar cane.
   Bakeries
   Others.

c. Seafood, Meat and Poultry processing and rendering, such as:
   Cow meat.
   Pork meat.
   Chicken and Turkey.
   Fish and Crustation.
   Eggs.

d. Pet food.

e. Dairies (milk, cheese, ice-cream, etc.).

2. Tanneries and leather industries.

3. Textile industry.
   Converters.
   Dying.

4. Paper Mills.

5. Hospitals.

6. Pharmaceutical industry.

7. Chemical industry.

8. Water Treatment:

Municipal Wastewater

Potable water

Sediment-laden aqueous solution.

Others except: soap, detergents, lipids such as fats, grease, oil, petroleum and derivatives, which are present in an aqueous solution as an emulsion, and not a colloidal suspension. In applications such as meat and poultry processing and rendering, where the fats and natural oils are part of the product processing or as a part of the discarded aqueous solution, and if the industrial processor has provided a treatment for first removing, by flotation, settling methods or other methods, the fats, oils and grease, then the resulting aqueous solution would be applicable for the utilization of the present invention.

Pretreatment:

Traditional pretreatment is applied to the treatable aqueous solution in order to remove large solid matter from the aqueous solution, if necessary. For example, this can be performed by screening or sedimentation.

Step 1—Coagulation

After any necessary screening or sedimentation is performed for removal of large solid matter (pretreatment), the resulting treatable aqueous solution is delivered as influent to Zone #1 where the positive ion addition compresses the double layer sufficiently to destabilize the colloidal suspension. This can be done, for example, by adding electrolytes while monitoring the Zeta potential. The solution is mixed, monitored and dosed as needed with an alkaline chemical electrolyte. Mixing also maintains the colloids in suspension.

Preferably, alkaline compounds such as those formed with Group IIA elements e.g. metallic hydroxides, or metal oxides such as iron oxides are used as the electrolyte. This includes compounds such as: calcium hydroxide and magnesium hydroxide. Other metallic hydroxides or oxides can be used depending on the composition of the aqueous solution, including Group VIII metal oxides such as iron (II) oxide (FeO); iron (III) oxides ($Fe_2O_3$); and mixed iron (II, III) oxides ($Fe_3O_4$).

Figure 1:
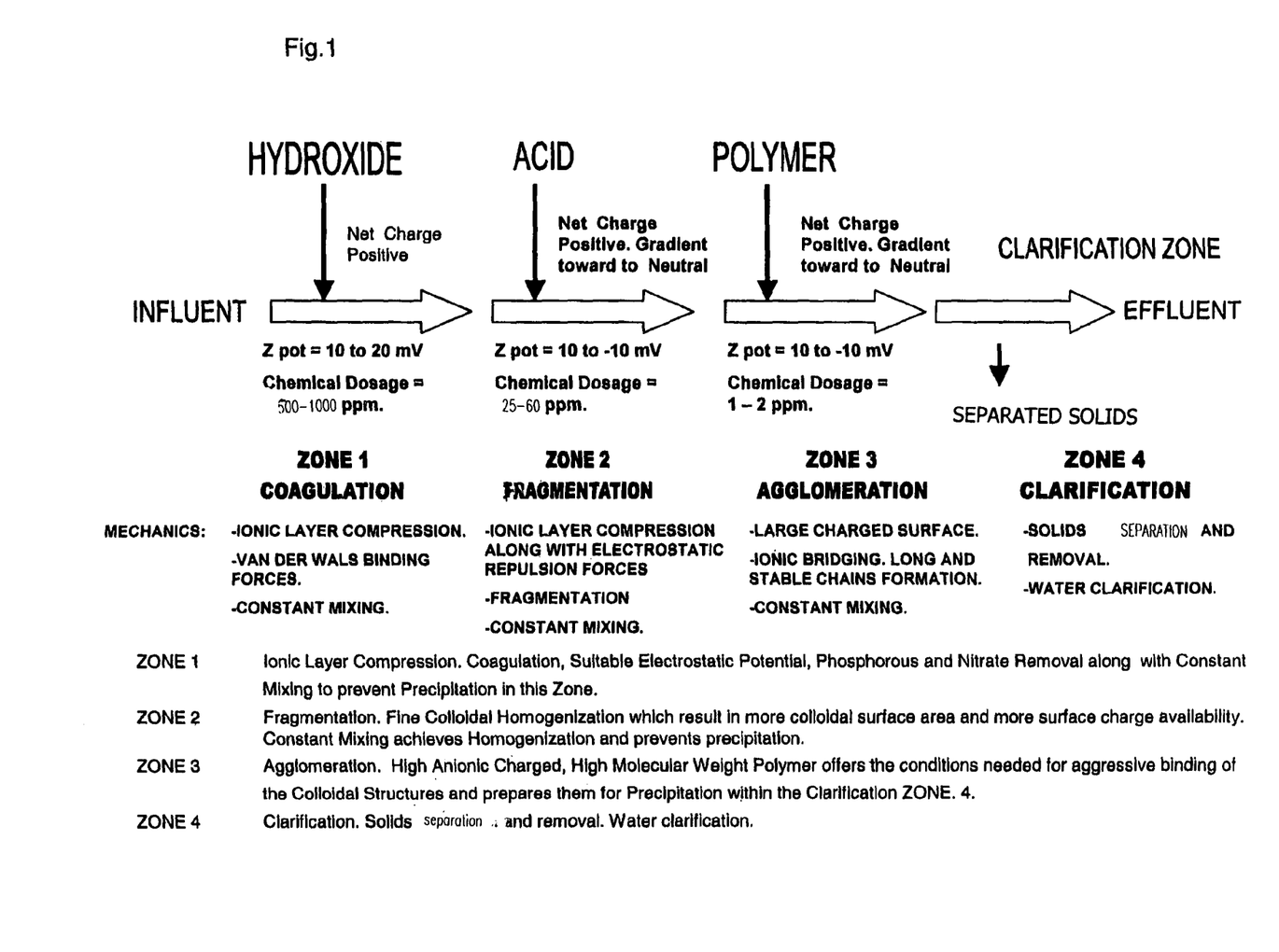
FIG. 1 shows the flow diagrammatically of the invention treating an aqueous solution containing contaminants in colloidal stable suspension. A brief description of the mechanisms that take place in each zone is presented.
Figure 2:
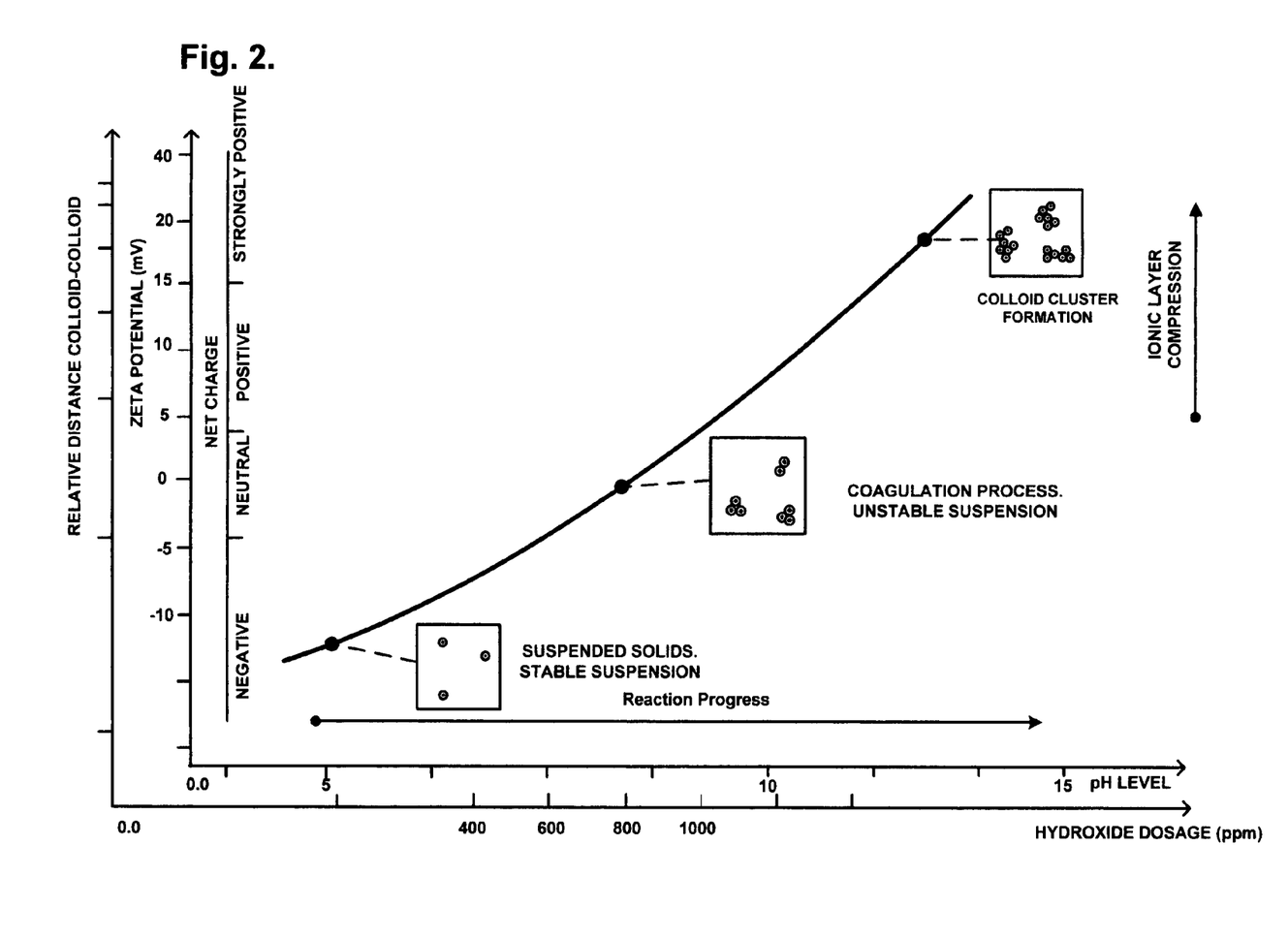
FIG. 2 shows the Electrostatic Potential in Zone #1 and the cluster formation mechanism.
Figure 4:
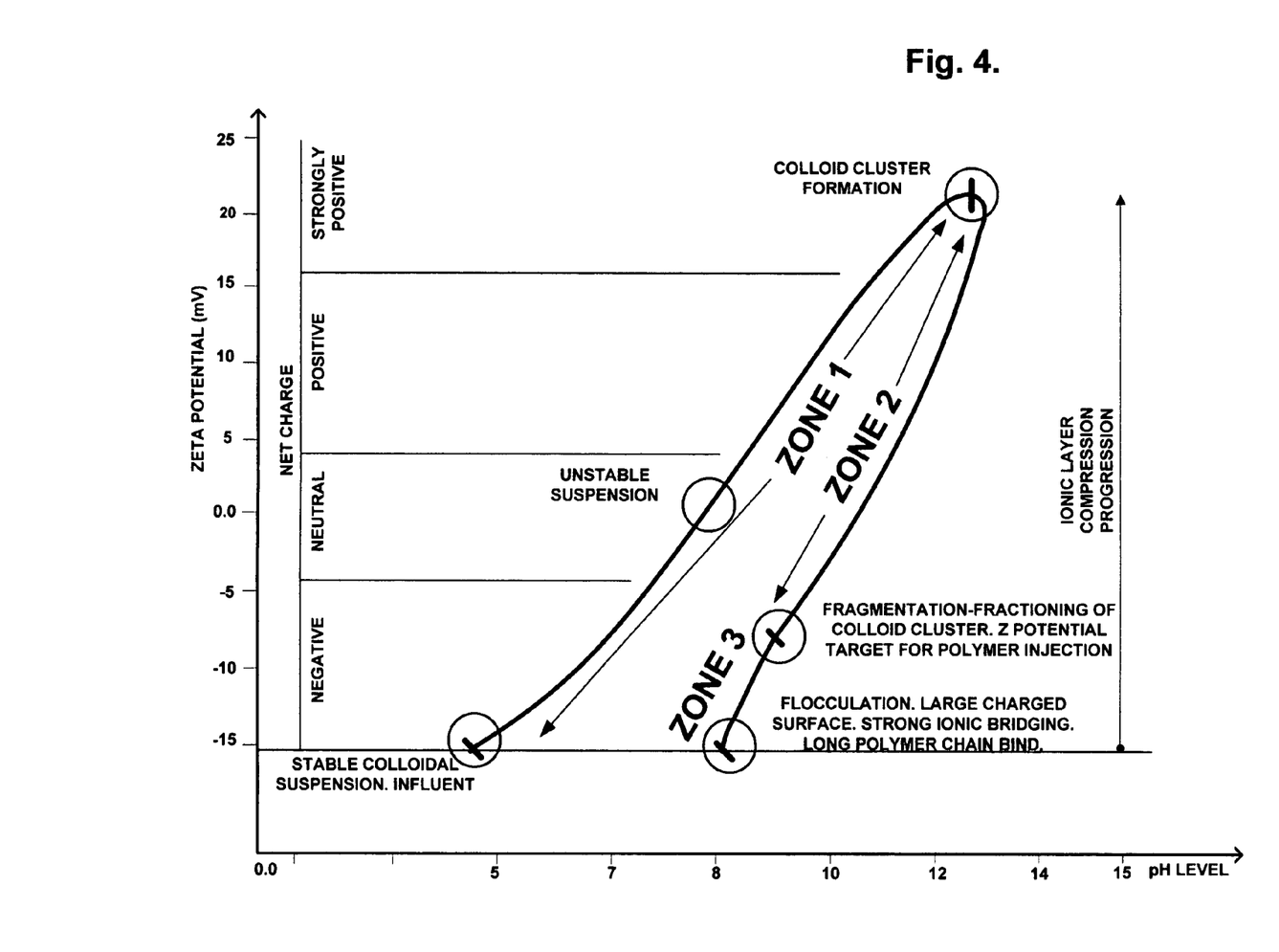
FIG. 4 shows the Electrostatic Potential Progression and the Coagulation-Fragmentation-Flocculation mechanics in the present invention.

Referring to the FIG. 1, FIG. 2 and FIG. 4, within Zone#1, while the aqueous solution's colloidal clusters are maintained in suspension by mixing, the Zeta potential is adjusted with the controlled introduction of the alkaline chemical so that the Zeta potential level is increased and maintained in Zone #1 substantially between 10 mV and 20 mV. This usually results in a pH between 10 and 12. Maintaining the Zeta potential substantially between 10 mV and 20 mV creates an environment that supports the desired agglomeration of colloid into large colloidal clusters.

The best range of Zeta potential for any particular aqueous solution treatment can be determined by testing procedures with utilization of commercially available laboratory apparatus designed for this purpose.

The agglomeration of colloids into large clusters occurs in Zone #1 while the mixer or agitator maintains a homogenous solution within. The reaction that occurs in Zone #1 promotes ionic layer compression, reducing the overall double ionic layer in the colloids, therefore diminishing the proximity repulsion force between colloid particles and reducing the energy barrier between the colloids so that the Van der Waals forces become the significant force and dominate interparticle interactions. Mixing also prevents the coagulated colloids (i.e. the large colloidal clusters) from settling. The mixing action provides kinetic energy to the colloids contained within the aqueous solution. This kinetic energy assists in the coagulation process. When colloidal surfaces are brought together close enough, (e.g. 0.01 microns or less), the Van der Waals forces overpower the repulsion forces. Mixing or agitation of the suspended colloids assist in the colloids to come closer to each other or collide, overcoming the energy barrier, therefore contributing to the process of coagulating the colloids and thus forming colloid clusters.

The clusters can also include an agglomeration of hydrophilic molecules such as proteins, amino acids and alcohols, depending on the aqueous solution's composition.

Although traditionally used electrolytes are used in the present invention, the addition of these electrolytes, especially metallic hydroxides or oxides from Group IIA or other metal oxides such as iron oxides, serves the process of the present invention differently in its application and its result than it would serve as used in traditional processes. As a coagulant in a traditional process, the chemicals from Group IIA act as electrolytes to increase the Zeta potential promoting destabilization of the colloidal suspension thereby assisting in the coagulation process causing the colloids to agglomerate into large clusters.

Ionic Conditioning

Ionic conditioning occurs in Zone #1 with this addition of Group IIA oxides and/or hydroxide compounds in the concentration range of substantially 500 PPM to 1000 PPM, which is monitored and confirmed by the solution's Zeta potential increasing to a range substantially between 10 mV and 20 mV, with a pH level ranging substantially between 10 and 12. At the ion concentration attained under these conditions, an environment of a high concentration of metallic ions +2 are created, thus producing a positive net ion layer on the colloidal particles. This action promotes the ionic layer compression, thereby overcoming the electrostatic barrier existing between colloids resulting in coagulation of colloids. A counter-ion cloud partitions this electrostatic barrier. The "Ionic Conditioning" of the present invention enables colloidal coagulation as a result of Van der Waals forces. The Van der Waal forces are assisted with the contributions of both the ionic conditioning and the kinetic energy from mixing provides a colloid to colloid compression force that results in a reduction of distance between the colloids to about 0.01 microns, or less, which then results in a coagulation of colloids.

Chemical/Molecular Conditioning—Colloidal Bonding

In the process of the present invention, the molecular arrangement or molecular state of the colloids change. Any existing carbon chains present in the aqueous solution such as proteins, amino acids, alcohols, lipids, surfactants, phenols and the colloids group including hydroxyl, carboxyl, phosphate and nitrate become the "tail" of the "carbon chain" charged negatively, and the metallic ions that have been added become the "head" of the carbon chain with a charge +2. This new molecular arrangement allows a bond to occur among colloids, between the negative tail and positive head. The Molecular Arrangement that was induced promotes colloid cluster formations in Zone #1.

This stage of colloid cluster formation in the aqueous solution creates an increment in its average Zeta potential to a range of 20 mV to 10 mV (See FIG. 4). In traditional methodology, according to the Zeta potential theory used to explain the coagulation process, the reaction that occurs within the average Zeta potential range of 10 mV to 20 mV result in dispersion. But rather, in the present invention, coagulation is present because of ionic layer compression created by the addition, in excess, of positive ions. Therefore, coagulation of the colloids occurs by the overcoming of the electrostatic barrier between the colloids.

Furthermore, tails and heads of the different colloids are attracted to each other forming large colloid clusters.

Physical Conditioning—Kinetic Energy Supporting Coagulation and Colloid Suspension Within Zone #1, the constant mixing of the aqueous solution produces two kinetic effects. One effect is that the kinetic energy imparts enough momentum to the colloids so as to assist in moving them across any residual energy barrier and assisting in the formation of large clusters of colloids, meanwhile the other kinetic energy effect is the maintaining of the colloid clusters in suspension.

Therefore, the conditioning treatment in Zone #1 achieves the formation of large clusters of the colloids contained within the aqueous solution and performed substantially within a range of 5 minutes to 15 minutes detention time, with a Zeta potential maintained at 10 mV to 20 mV and a pH level maintained substantially within a range of 10 to 12.

FIG. 2 shows the Electrostatic Potential in millivolts in Zone #1 and the large colloidal cluster formation mechanism.

Step 2—Fragmenting of Agglomerated Colloidal Particle Clusters

The treatable aqueous solution is delivered to Zone #2 of the present invention. The second chemical as utilized in the present invention is added and mixed with the aqueous solution contained in Zone #2. Continuous mixing of the aqueous solution in Zone #2 is performed in order to keep the colloid clusters suspended and the mixture uniform.

In Zone #2 of the present invention, the chemical type utilized is an acid, preferably from the non-metallic Group VA and IVA. These groups of non-metallic acids act as a reagent in the present invention. Examples of these acids are: phosphoric acid, nitric acid, hydrochloric acid and carbon dioxide (carbonic acid). These acids are added in amounts so as to adjust the Zeta potential to the range of between 10 mV to −10 mV, along with a resultant adjustment of the pH to have a range from about 8 to 8.5.

The non-metallic acid, such as phosphoric acid, is injected into the aqueous solution on an as needed basis in order to attain, and maintain, a concentration level substantially ranging from 25 ppm to 60 ppm. As the conditioning process of the aqueous solution in Zone #2 progresses, the Zeta potential decreases to 10 mV to −10 mV and the pH level adjusts substantially to a range of 8 to 8.5. The conditioning processes that occur in Zone #2 of the present invention transition the aqueous solution with physical, chemical and ionic changes.

Ionic Conditioning—Supporting Fragmentation

The ionic conditioning of the aqueous solution in Zone #2 is a result of its dosing with the non-metal acid phosphoric acid, as is utilized in this embodiment, with the aqueous solution. The addition of the non-metal acid contributes negative ions and hydrogen ions (H+) to the molecular structure. The ions charged −3 provide negative charges and the hydrogen ions [H+] provide positive charge. The counter ion cloud or double layer is charged with ions charged −3. With the existing hydroxide in excess, and with it combining with the negative charged ions, they form salt. The existing positive charged colloids are attached with negative −3 ions contributed by the non-metallic acid, and resulting as negative radicals being attached to the colloids. The hydrogen ions [H+] are combined with hydroxide ions [OH—] producing water. There are two effects created by the introduction of negative ions −3. The first effect of the introduction of negative ions −3 produces a heterogeneous distribution of negative charges on the surface of the large colloid clusters changing the charge level from strongly positive to positive (see FIG. 4) as obtained in Zone #1 and with the decreasing the Zeta potential of the aqueous solution in Zone #2. These weakened charges selectively repel each other which results in the fragmenting of the large colloid clusters into smaller colloid clusters. The smaller colloid clusters have positive regions (or "patches") and negative regions (or "patches") non-uniformly distributed. Those negative regions in the fragmented colloid clusters are responsible for the repulsion effect among the fragmented colloid clusters. This fragmentation result is contrary to the coagulation process results when using traditional methods.

A second effect of the trivalent negative ion is the increasing of the ionic layer compression and bringing more suspended and dissolved solids to the colloidal stage.

Chemical Conditioning—Molecular Arrangement

Not all existing carbon chain molecules present in the aqueous solution have a negative charge. There also exist molecules with positive radical or positive dipole charges. Therefore, the participation of trivalent negative ions is key to the binding of mostly all of the targeted dissolved solids and bringing them to the colloidal stage, while another mechanism supports the targeted dissolved solids becoming suspended solids and colloids. That mechanism is the ionic migration of $Ca^{+2}$ ions as a dissolved solid (hardness) being exchanged with the targeted dissolved solids. Furthermore, it is observed that a fragmentation of the colloid clusters into smaller clusters takes place and transitions to a fine colloidal cluster homogenization. Additional reactions take place between the free metallic ions and non-metallic ions forming a salt precipitate.

The chemical conditioning of the aqueous solution occurring in Zone #2 results with an alteration to the Molecular Arrangement of the Total Suspended and targeted Dissolved Solids to form colloids and to fragment the colloids for efficient reactions to occur in Zone #3.

Physical Conditioning—Homogenization

Figure 5:
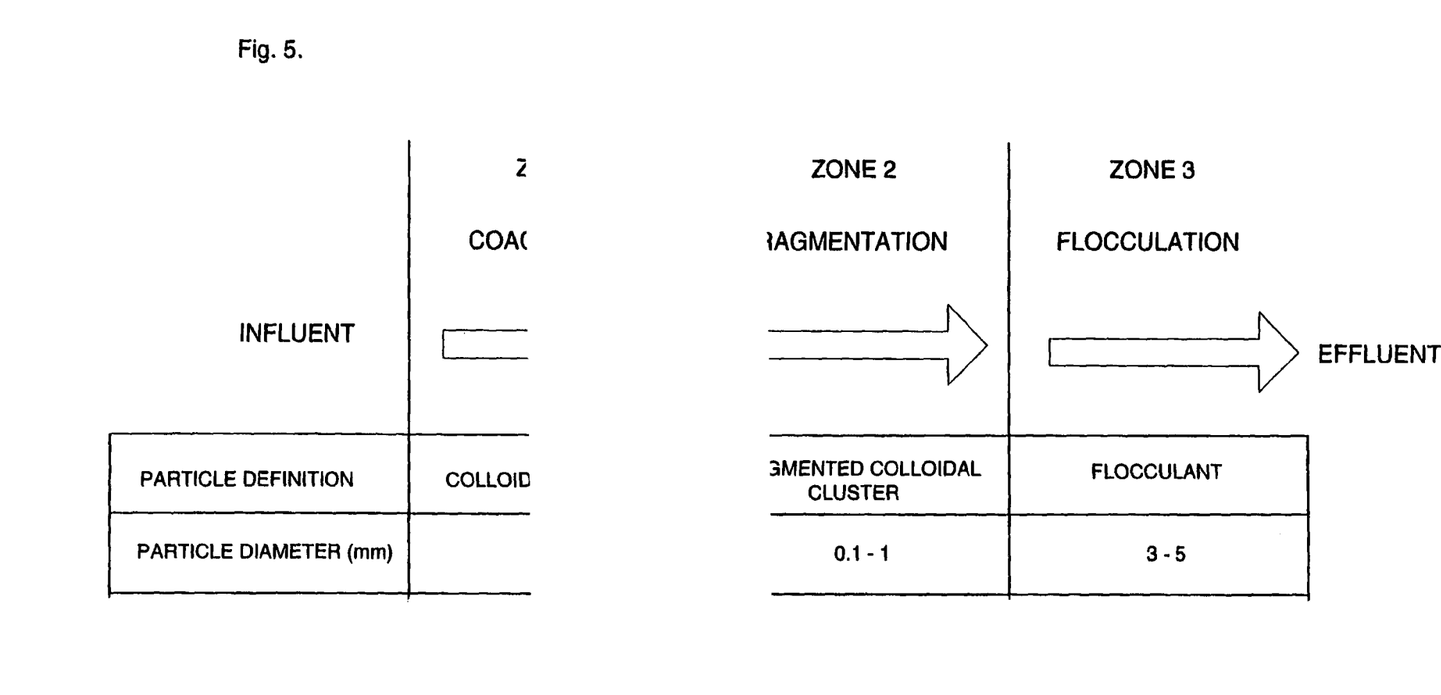
FIG. 5 shows the Particle descriptions within each Zone.

Constant mixing of the aqueous solution contained within Zone #2 is the physical conditioning that occurs to the colloid cluster structure and in so doing, the mixing keeps the colloid clusters in suspension and uniformly distributed in the solution so that other reactions that occur within Zone #2, occur uniformly. Thus the colloidal clusters are fragmented into a substantially uniform, fine colloidal clusters (see FIG. 5) and are homogeneously distributed within the aqueous solution. The solution is continuously mixed so as to maintain the fragmented colloidal clusters in suspension.

The fragmentation stage in Zone #2 of the present invention attains and is maintained at an average Zeta potential from 10 mV to −10 mV, which promotes the fracturing of the large clusters and thus results in more physical surfaces available and more surface charge availability along with a consistent and optimum electrostatic potential for the flocculation process occurring in the next step of the present invention.

Figure 3:
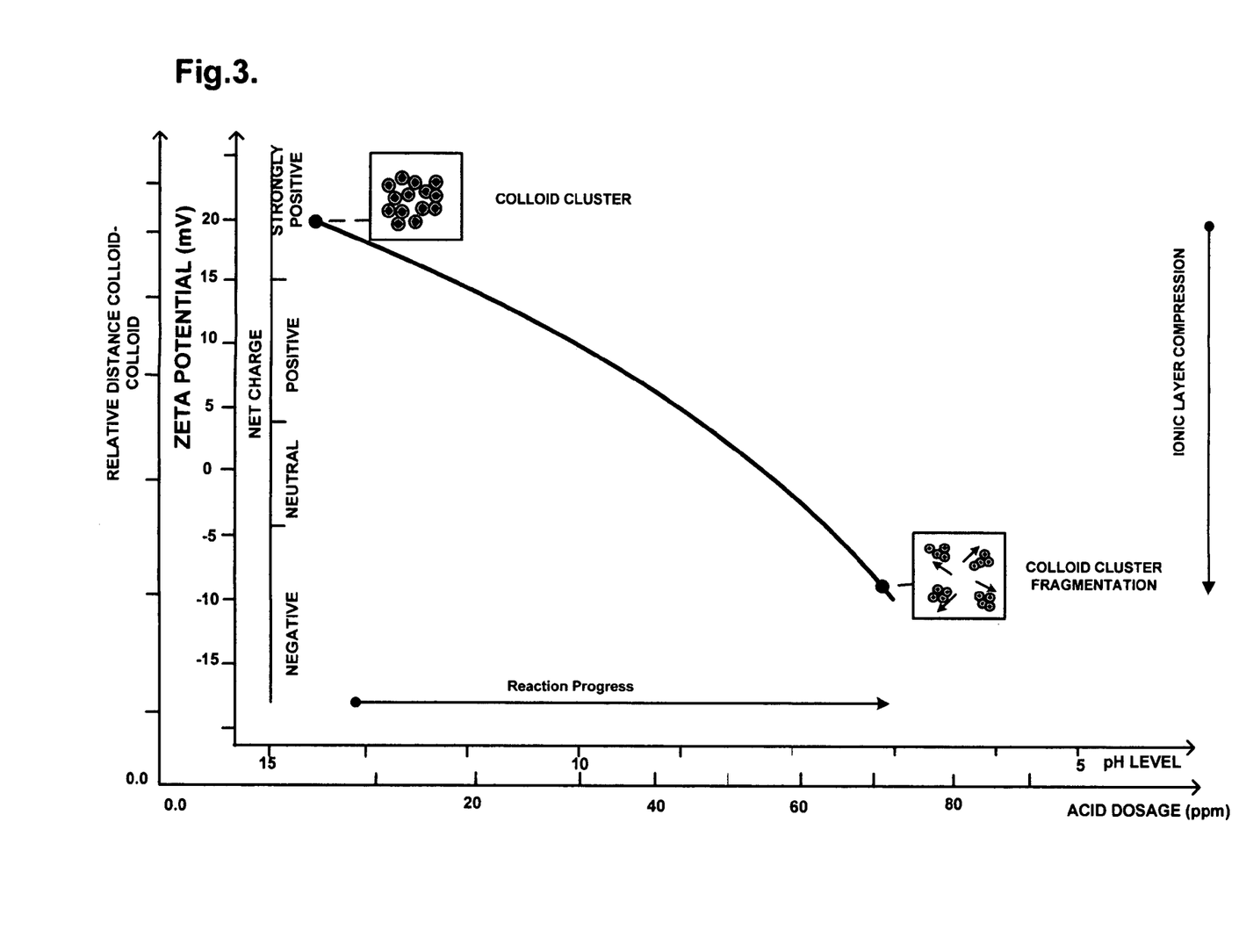
FIG. 3 shows the Electrostatic Potential in Zone #2 and the Fragmentation Process.

FIG. 3 shows the Electrostatic Potential in millivolts of the aqueous solution within Zone #2 and depicts the colloid cluster fragmentation and fine colloid cluster homogenization mechanisms.

Step 3—Flocculation

The conditioned aqueous solution from Zone #2 is delivered to Zone #3 of the present invention into which a flocculating agent polymer is injected. This process is substantially a traditional process using commercially available polymers synthesized for flocculation purposes. However, the aqueous solution was specifically conditioned within Zone #1 and Zone #2 so that the resulting fragmented colloid clusters effectively have more surface area availability and more available opposing surface charges as compared to the polymer's charge, thus leading to a stronger bonding with the polymer additive and thus providing for a more efficient sedimentation process and a more efficient removal of colloids in following treatment step(s)(as might be required by design for specific discharge requirements).

Zone #3 receives the aqueous solution, from Zone #2, containing the fragmented colloid clusters in suspension. The aqueous solution contained within Zone #3 is injected with an anionic polymer having sites that bind to substantially all of the metallic ions situated in the positive region on the surface of each colloid cluster and forms long polymer chains that result in the trapping of substantially all of the colloids. Because the positively charged patches are on the more available surfaces of the fragmented colloidal clusters in the aqueous solution, the binding of the colloid clusters to the polymer additive to form flocculants is highly efficient. An example of a commercially available polymer specifically synthesized for use in this environment is "Hyperfloc" ANIONIC DRY FLOCCULANT—AF 304 or AF 307, available from "Hychem, inc." Tampa, Fla. Other anionic polymer flocculating agents can be used.

The conditioning processes that had taken place in Zone 1 & 2 similarly provide negative regions in addition to the positive regions on the fragmented colloid cluster surfaces. This would also allow the use of cationic polymer to bind substantially all of the non-metallic ions situated in the negative region of the colloid cluster surface and form long polymer chains that result in the trapping of substantially all of the colloids. An example of a commercially available polymer specifically synthesized for use in this environment is CYTEC CATIONIC EMULSION FLOCCULANT—SUPERFLOC 4516 or 4518, available from "Cytec Industries Inc." West Paterson, N.J. Other cationic polymer flocculating agents can be used.

As the flocculation process takes place in Zone #3, the mixing is adjusted to a constant slow mixing of the aqueous solution, at a rate to sufficiently maintain the polymerization effect along with substantially keeping all of the bound flocculent formations suspended in solution. This rate of mixing is a little more vigorous than the usual mixing methods used during flocculation. This rate of mixing variance is specifically designed to keep the floc in suspension. One can determine a useful mixing rate by observing the floc and keeping it in suspension.

FIG. 4 shows the Electrostatic Potential Progression in millivolts occurring in Zone #3. The cumulative strength of available positive net ion charge along with the adequate Electrostatic Potential creates the environment for fast and consistent flocculation, along with obtaining large floc. Large floc is preferred for fast settling.

Step 4—Precipitation of Solids

The aqueous solution of Zone #3 is delivered to Zone #4 for a separating and clarification of flocculants. Traditional means of clarification takes place in Zone #4. Flocculants are separated out from the aqueous solution. The effluent and solid matter (sludge) are further treated (if required) as process performance requirements and discharge requirements dictate. These additional treatments can be performed by traditional methods in order to meet the required specifications for discharge of effluent and disposal of solids.

In any case flocculent is more easily and more quickly precipitated and removed so that smaller clarifying equipment can be used.

EXAMPLE

The Treating of Winery "Crush Process" Wastewater with the Present Invention

Figure 6:
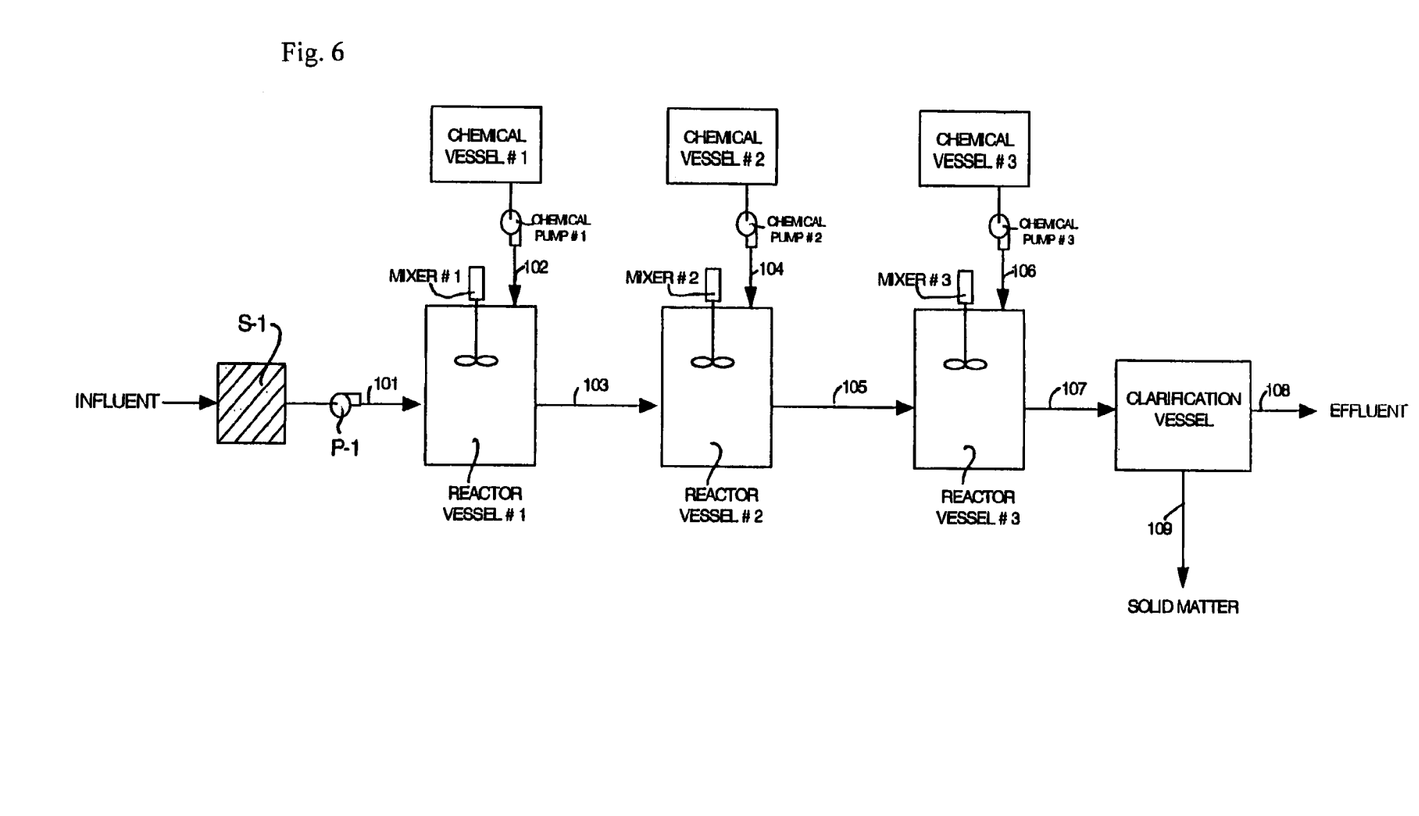
FIG. 6 shows a flow diagram of an embodiment of the invention using gravity flow between zones, although pumps (not shown) can optionally be used.

Referring to FIG. 6, wastewater discharge from the grape "crush process" contains grape peel, re-used process water containing concentrated organic material, detergent and equipment cleaning chemicals that are used during cleaning processes. Winery wastewater discharge typically has BOD and COD readings ranging substantially between 1000 and 10,000 mg/L.

Winery "Crush Process" wastewater stream is screened (S-1) for the removal from the waste stream of particulates that are over 0.25 inches and matter that settles out quickly. The remaining wastewater stream is then pumped from the screening zone by P-1 through line 1 and delivered to Reactor Vessel #1. The wastewater stream is discharged into Reactor Vessel #1 and is mixed constantly with Mechanical Mixer #1 so as to retain in suspension and uniformly mixed, substantially all of the particulates contained in the treatable wastewater stream.

From Chemical Vessel #1 a stream of the chemical solution containing High Calcium Hydrated Lime that is composed of $Ca(OH)_2$ of 82-98% purity and maintained in a diluted state so that the ratio substantially is maintained at 3.5 lbs. of water to 1.0 lb. of lime. As shown in FIG. 6, this chemical solution is delivered via Chemical Pump #1 from Chemical Vessel #1 through line #102 to Reactor Vessel #1 at such a rate so that the solution in Reactor Vessel #1 maintains a Calcium Hydroxide concentration that is substantially in the range between 500 ppm and 800 ppm which will maintain a pH level of the combined wastewater solution substantially in the range of 11 to 11.5

The chemical solution is thoroughly mixed into the wastewater that is contained within reactor Vessel #1 by the constant mixing action delivered via Mixer #1. Mixer #1 also serves the present invention process by providing enough agitation to the solution so as to keep the solid particulates in suspension while the solution is retained in Reactor Vessel #1.

The chemical, ionic and physical reactions that occur with use of the present invention in Reactor Vessel #1, cause the coagulation of the suspended and dissolved colloidal particles to form colloidal clusters, This stage of the processes of the present invention provides an increment in the average Zeta potential from substantially –5 mV to approximately 20 mV at a pH level of near 11 to the wastewater solution in reactor Vessel #1.

The wastewater containing the colloidal clusters in suspension, as derived from the process of the present invention within Reactor Vessel #1, is delivered through line #103 to Reactor Vessel #2. Reactor Vessel #2 receives the wastewater solution with the colloidal clusters in suspension and maintains the colloidal clusters in suspension throughout its retention period within Reactor Vessel #2 with the utilization of Mixer #2 delivering constant agitation to the solution. Mixing should be performed at a rate so as to only keep the colloidal clusters in suspension and not as aggressive so as to tear the clusters. Injected and mixed into the wastewater solution of Reactor Vessel #2 is a solution of phosphoric acid delivered from Chemical Tank #2 by Chemical Pump #2 through line #104. The Phosphoric acid contained in Chemical Tank #2 is maintained at substantially a 50 to 75% concentration and delivered to Reactor Vessel #2 as such. The acid, when injected and mixed into the wastewater solution acts as a reagent and thus conditioning the wastewater solution's suspended colloidal clusters to conform to the process requirements of the present invention.

Phosphoric acid is delivered into the wastewater stream contained within Reactor Vessel #2 at a rate of flow so as to derive its level of concentration substantially ranging from between 25 ppm and 60 ppm and thus reaching a pH level substantially ranging from 8 to 8.5. The introduction of the Phosphoric acid into the wastewater solution of the Reactor Vessel #2 activates the second stage process of the present invention to occur. The resulting reactions achieve the fragmentation of the suspended colloidal clusters. This fragmentation process of the present invention derives a resulting wastewater solution containing colloidal suspensions with a significant increase in aggregate available surface charges, as compared with the aggregate available surface charges contained in the originating inflow of colloidal clusters in suspension as derived from Reactor Vessel #1. The resulting conditioning of the wastewater solution contained in Reactor Vessel #2, as derived by the process of the present invention, is further influenced by the availability of the trivalent ion which increases the ionic layer compression and thus bringing more of its suspended and targeted dissolved solids to the colloidal aggregation.

This stage of the processes of the present invention provides a decrement in the average Zeta potential as measured in the wastewater solution contained within Reactor Vessel #2 ranges from a reading of substantially 10 mV to approximately a negative −10 mV and at a pH level of near 8.

Constant mixing of the wastewater solution contained within Reactor Vessel #2 will keep the fragmented colloidal cluster state in suspension without it precipitating.

The wastewater solution containing the fragmented colloidal clusters in suspension containing the effective net ion charge and the adequate Electrostatic Potential, as derived from the process of the present invention within Reactor Vessel #2, is delivered through line #105 to Reactor Vessel #3. Reactor Vessel #3 receives the wastewater solution with the fragmented colloidal clusters in suspension.

Injected and mixed into the wastewater solution of Reactor Vessel #3 is a chemical solution containing an Anionic Polymer ("Hyperfloc" ANIONIC DRY FLOCCULANT—AF 307 (see above)) delivered from Chemical Tank #3 by Chemical Pump #3 through line #106. The Anionic Polymer contained in Chemical Tank #3 is hydrolized from an Anionic Acrylamide Copolymer powder with high charge and high molecular weight, hydrolyzed in water. The Anionic Polymer solution injected into and mixed with the wastewater solution contained within Reactor Vessel #3 is delivered in amounts so as to achieve a consistent homogeneous level within a concentration range of substantially between 10 to 20 ppm.

A gentle mixing is provided to the wastewater stream contained within Reactor Vessel #3 by way of Mixer #3 so as to provide a homogenous mixture of Anionic Polymer with the fragmented colloids and to create large flocculants and to maintain the large flocculants in suspension.

The resulting treated wastewater solution is delivered from Reactor Vessel #3 through line #107 to a clarification vessel. It should be noted that care should be used in the equipment and design of the solution transfer mode which conveys the solution of polymerized colloids from the Reactor Vessel #3 to the clarifier equipment so as to not cause the breakage of the chains of colloids during the transfer. With the use of traditional clarification means, the polymerized colloids are precipitated out of solution and the resulting effluent is either discharged or further treated though traditional means so as to meet specified discharge requirements. The resulting effluent from the processes of the present invention has a substantial reduction in Biochemical Oxygen Demand (BOD), Chemical Oxygen Demand (COD), Total Suspended Solids (TSS) along with the reduction of other nutrients such as nitrate, nitrite, sulfates, phenols, phosphates. The solid matter that is derived from the precipitate is removed, discarded or treated further as per the specifications of the system design might state. The present invention, as utilized in this embodiment, does not add any additional hazardous materials to the separated solid matter or to the effluent discharge, as a result of its process.

Additional advantages and modifications will readily occur to those skilled in the art. In particular, it is usual in this art to modify parameters, including mixing rates, reaction (or holding) times, amounts and types of reactants, separation methods (if any are used) and reaction vessels (e.g. tanks connected by gravity feed pipes or pumping arrangements, continuous flow through reactors etc according to the needs of the process), and others. It is contemplated that water containing a wide range of suspended material can be processed under efficient conditions by applying usual laboratory testing of parameters and reagents following the description of the invention herein along with usual knowledge in this art and commercially available equipment available for this purpose. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. A process for conditioning an aqueous suspension of colloidal particles and dissolved solids for efficient precipitation, wherein the colloidal particles have an ionic layer of like charges the mutual repulsion of which like charges maintaining the particles in suspension;

the process comprising the steps of compressing the ionic layer to reduce the repulsion between particles sufficiently for Van der Waal forces to overcome repulsive forces and agglomerate the particles into large clusters by adding sufficient hydroxide and/or oxide of a group IIA metal or of iron to attain a pH range between 10 to 12, a Zeta potential from +10 mV to +20 mV and larger particle clusters between 1 mm to 3 mm, in said aqueous suspension;

adding sufficient negative charge comprising non-metallic acid to the large clusters to destabilize and fragment the large particle clusters into fragmented smaller particle clusters and transition to a fine colloidal cluster homogenization including said dissolved solids at a pH of about 8 to 8.5 and a Zeta potential of −10 mV, with fragmented smaller particle clusters ranging between 0.1 mm to 1 mm flocculating the aqueous suspension with a polymeric flocculating agent to form a flocculate including the fragmented smaller particle clusters and dissolved solids.

2. The process of claim 1 wherein the group IIA metal is calcium and/or magnesium, the iron is in the form of Ferric or Ferrous oxide; and the nonmetallic acid is nitric acid and/or carbonic acid and/or phosphoric acid and/or hydrochloric acid.

3. The process of claim 1, wherein agglomerated particles are kept suspended by stirring.

4. The process of claim 1 wherein the flocculating agent is a anionic polymer.

5. The process of claim 1, wherein the flocculating agent is a cationic polymer.

* * * * *